United States Patent [19]
van der Lely et al.

[11] Patent Number: 5,816,192
[45] Date of Patent: Oct. 6, 1998

[54] FEED WAGON

[75] Inventors: Cornelis van der Lely, Zug, Switzerland; Karel van der Berg, Bleskensgraaf, Netherlands

[73] Assignee: Maasland N.V., Maasland, Netherlands

[21] Appl. No.: 677,555

[22] Filed: Jul. 8, 1996

Related U.S. Application Data

[63] Continuation of PCT/NL95/00385, Nov. 8, 1995, published as WO96/14735, May 23, 1996.

[30]     Foreign Application Priority Data

Oct. 11, 1994  [NL]  Netherlands ........................... 9401876

[51] Int. Cl.$^6$ ....................................................... A01K 5/02
[52] U.S. Cl. ......................................................... 119/57.92
[58] Field of Search ........................... 119/57, 57.1, 57.5, 119/57.91, 57.92

[56]              References Cited

U.S. PATENT DOCUMENTS

| | | | |
|---|---|---|---|
| 4,330,091 | 5/1982 | Rozeboom et al. | 241/73 |
| 5,069,165 | 12/1991 | Rousseau | 119/57.6 |
| 5,255,195 | 10/1993 | Mochizuki et al. | 364/449 |
| 5,309,864 | 5/1994 | Harmsen et al. | 119/57.6 X |
| 5,353,740 | 10/1994 | Pellerin | 119/57.92 |
| 5,355,833 | 10/1994 | Legrain | 119/57.92 X |

FOREIGN PATENT DOCUMENTS

| | | |
|---|---|---|
| 0456213A1 | 11/1991 | European Pat. Off. . |
| 2 682 781 | 4/1992 | France . |
| 26 39 423 | 3/1977 | Germany . |
| 30 33 485 A1 | 4/1982 | Germany . |
| WO88/09119 | 12/1988 | WIPO . |
| WO 91/08344 | 11/1991 | WIPO . |
| WO 92/08343 | 11/1991 | WIPO . |

OTHER PUBLICATIONS

Lantechnik, vol. 37, No. 9, Sep. 1982, p. 408 (In German).
International Search Report (PCT) for Netherlands.
Application No. 9401876, filed Nov. 10, 1994 (In Dutch).

*Primary Examiner*—Thomas Price
*Attorney, Agent, or Firm*—Penrose Lucas Albrigh

[57]              ABSTRACT

A feed wagon for feeding silage or concentrate, or both, to animals, such as cows, which comprises automatically operated loading and unloading mechanisms. The wagon selectively automatically loads silage at ground level at two slot silos and silage or concentrate at a standing silo. It discharges in a feed alley between stalls in a cowshed. The route between the slot silos, the standing silo, and the feed alley is marked by active or passive beacons. The wagon carries detectors for detecting the beacons and a computer which cooperates with the detectors and steering mechanisms for the wagon to move the wagon between the slot silos, the standing silo and the feed alley travelling on the route marked by the beacons. The method comprises automatically loading relatively small quantities of silage on the feed wagon, moving that silage to the feed alley by guidance from its onboard computer and detection of the passive beacons between the silos and the cowshed, automatically discharging the silage in the feed alley to be received by stalls, moving the feed wagon after discharging silage to a selected silo by guiding the onboard computer and detection of the beacons along the route and repeating these steps on a substantially continuous basis.

34 Claims, 1 Drawing Sheet

FEED WAGON

RELATED APPLICATION

This is a Continuation Application of PCT Application PCT/NL95/00385, filed Nov. 8, 1995.

FIELD OF THE INVENTION

The present invention relates to a feed wagon for feeding silage, fodder and/or concentrate to animals, such as cows.

SUMMARY OF THE INVENTION

Such feed wagons are known. The present invention, is characterized in that it comprises a feed wagon that automatically loads and unloading means.

Also according to the invention, the feed wagon is capable of being automatically moved between one or more feed loading stations and one or more feed unloading stations, such as animal stands. Therefore, the invention also relates to a feed wagon for supplying fodder to animals, such as cows, the feed wagon being automatically movable between one or more feed loading stations and one or more feed unloading stations.

In an advantageous embodiment, the feed wagon includes a sensor for tracking a cable, which is installed in or on the ground and indicates the route to be followed. However, the invention also relates to a feed wagon that is capable of being moved along a rail system. In again an other embodiment, the feed wagon includes an automatic navigation system cooperating with passive beacons. According to the invention, such feed wagons operate as unmanned ones.

BRIEF DESCRIPTION OF THE DRAWINGS

For a better understanding of the present invention and to show how the same may be carried into effect, reference will now be made, by way of example, to the accompanying drawings, in which.

DESCRIPTION OF THE PREFERRED EMBODIMENTS

Figure 1:
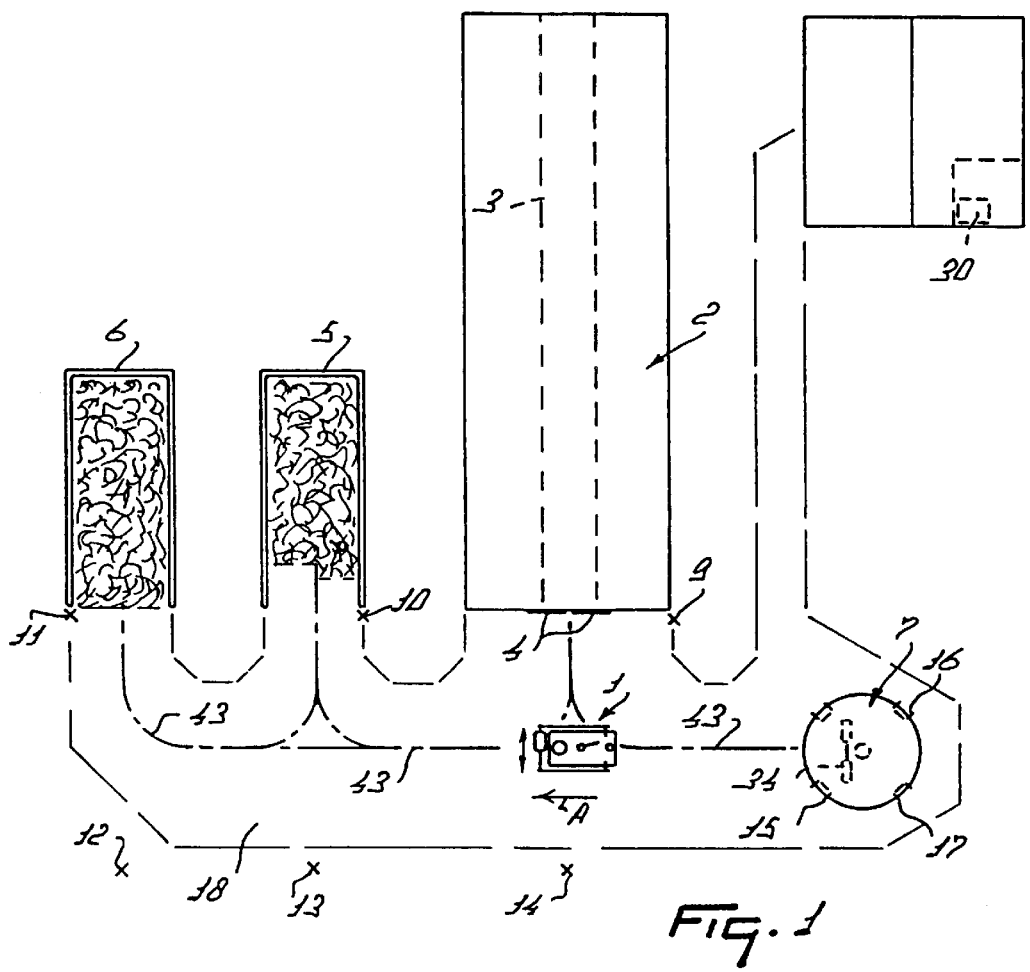
FIG. 1 is a plan view of a working environment for a feed wagon according to the invention.

In the drawings, corresponding parts are indicated by the same reference numerals.

FIG. 1 illustrates a working environment, in which an automatically operating feed wagon designated generally by reference numeral 1 of the invention is employed for feeding animals. The working environment according to the embodiment shown comprises a stable or cowshed 2, in the longitudinal direction of which there is provided a feed alley 3. The present cowshed includes stands for receiving animals, disposed transversely to the longitudinal direction of cowshed 2, their heads being directed towards feed alley 3. Adjacent to feed alley 3, and from there to be provided with fodder, a feed station, such as a feed trough, is provided for each of the separate animal stands. Cowshed 2 is accessible from the outside through a door 4 which, according to the present invention, is capable of being opened automatically by remote control. Furthermore, the illustrate working environment includes two slot silos 5 and 6 in which silage is stored. By means of supports there is also provided, raised above the ground, a standing silo 7 which serves as a storage facility for concentrate. Feed wagon 1 is automatically movable between one or more feed loading stations 5, 6 and 7 and one or more feed unloading stations 3. In this embodiment, the feed loading stations comprise slot silo 5 or 6 and/or standing silo 7, and feed unloading stations comprise one or more animal stands in feed alley 3 of cowshed 2. During operation, the feed wagon 1 orientates itself by its bearing relative to one or more guidance means identified herein as beacons 9, 10, 11, 12, 13, 14, 15, 16 and 17. These beacons 9–17 are each individually distinguishable. They comprise existing, permanent environment elements 15 and 16 and specifically placed, physically coded beacon elements 9, 10, 11, 12, 13 and 14. In cowshed 2 there are provided at least two further beacons (not shown).

Figure 2:
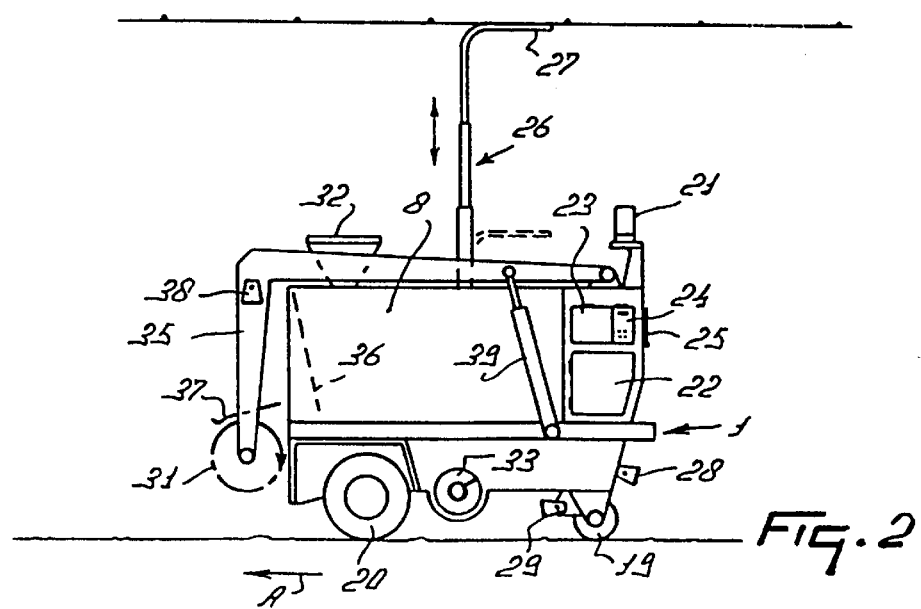
FIG. 2 is a side elevational view of a feed wagon according to the invention.

FIG. 2 shows the automated feed wagon 1 of the invention, which wagon is used for automatically feeding animals, in accordance with the invention and as explained in what follows. The dimensions of the feed wagon are approximately: width one meter, height one meter, and length 1.75 meters. Feed wagon 1 comprises a chassis including drivable wheels 20. The present embodiment comprises three wheels, of which the two larger front wheels 20 are driven. These wheels are mounted so that their shafts are in alignment. In the present embodiment, the third wheel 19, diameter of which one half is that of front wheels, is controllable by means of a computer. Feed wagon 1 comprises an almost completely closed feed box 8. This box is provided with a mixing device, which is constituted by two mixing augers in the present embodiment. With the aid of an electronic weighing device, the feed box is supported on the chassis of feed wagon 1. Near its rear end, the feed wagon comprises a power supply 22, which comprises batteries in the present embodiment. In the vicinity of power supply 22 there is provided an onboard computer 23 for controlling the various functions of the feed wagon. Fed wagon 1 is also provided with means of communication for the exchange of information and instructions with an other, e.g. stationary, central computer 30. In the present embodiment, the central computer is the business computer situated in the office part of the farmhouse. The communication between the onboard computer 23 and the other computer 30 takes place by so-called "spread spectrum radio wave technology". In another design according to the invention, in which the central computer is located in cowshed 2, the communication takes place by means of infrared signals. Other input means for the onboard computer 23 are constituted by a foldably connected keyboard 24, which is suitable for use under all circumstances. This keyboard is also provided with a so-called "joystick", by means of which feed wagon 1 can be manually controlled, if required, and during the programming of the route to be followed. Feed wagon 1 also includes a foldable display screen 25.

In the present embodiment, the batteries 22 of feed wagon 1 can be charged during operation with the aid of electric charging means, here in the form of a sliding contact 26. This sliding contact is designed in the present embodiment as a three-stage telescope which, in the inactive position, disappears vertically and almost completely in feed wagon 1. In the active position, a branched off end 27 provides a sliding contact with a supply line disposed beyond human reach. In a preferred embodiment, this supply line is mounted above the feed alley 3 of the cowshed 2. The three-stage telescope 26 is shielded by means of insulation up to the contact end 27.

Feed wagon 1 is provided with a detection system 21 to determine its position and to deduce its direction and speed. In the embodiment shown, this system is constituted by a rotating scanner 21. Though, in a preferred embodiment, this scanner is designed as a laser sensor, it may also be designed as an ultrasonic one. With the aid of scanner 21, the beacons 9–17 in the farmyard, being distinguishable from each other and being inputted in the onboard computer 23, are identified. Furthermore, ultrasonic sensors are provided along the circumference of the feed wagon 1. These sensors serve to measure, below the level of scanner 21, the distance to unexpected, inanimate objects or obstacles, and to ensure security in this respect. Additionally, feed wagon 1 is provided with passive infrared detectors 28 directed forwards and backwards for the detection of unexpected, animate objects. These detectors are focussed on an immediately neighboring part of the path chosen by the feed wagon 1. In a preferred embodiment, feed wagon 1 also includes a passive infrared detector 29 covering the ground under feed wagon 1, preferably from near the rear wheel. In another embodiment, the feed wagon also comprises a railing surrounding it at a height of approximately thirty centimeters, this railing being on all sides provided with a flexibly enveloped so-called make-contact; compression thereof results in feed wagon 1 being put out of operation. This embodiment is also provided with means for moving such a security element in the longitudinal direction of the vehicle, e.g. when the vehicle has necessarily to be positioned close to a known object, inter alia the silage. At the sides, the security element extends relatively close along the feed wagon and, at its front and back, at a distance of approximately forty centimeters. Furthermore, the feed wagon comprises an electronic leveling device for the detection of a non-horizontal position thereof. Upon detection of the latter condition, the feed wagon is automatically put out of operation and a still to be described alarm signal is given.

Feed wagon 1 is furthermore provided with an infrared transmitter capable of cooperating with a receiver of a system for automatically opening one or more doors 4 of the cowshed 2, or other suitable openings for allowing the feed wagon 1 to pass. In an alternative embodiment, the opening of the door is effected by means of the central computer 30. With the aid of one of the two systems for opening stable door 4, the opening and closing is effected during operation in such a manner that the time of opening will be as short as possible. The onboard computer 23 or the central computer 30 will take into account the actual forward speed of the feed wagon and the time of opening required for stable door 4.

Furthermore, feed wagon 1 comprises automatically operating loading and unloading systems including loading and unloading means 31, 32 and 33. The loading system shown in the embodiment includes loading means for loading concentrate from silo 7 at a level above the ground. The loading system also comprises a loading member indicated by reference numerals 31 and 35 for taking ensilaged bulkage from silage silos or from so-called slot silos 5 and 6. For the purpose of loading concentrate, the feed wagon comprises a funnel-shaped collecting element 32 and a control element for opening a slide of the standing silo 7. This control element is designed to include so-called actuators, but may also be designed to include hydraulic cylinder/piston units. To that end, the feed wagon is equipped with an hydraulic circuit comprising an electrically driven pump. In the present embodiment, a lever 34 of silo 7's slide is operated by means of this system. The loading system for silage comprises an arm 35, which is pivotable about a shaft disposed transversely to the direction of travel A and near the rear of the feed wagon, an exsilage member 31, by means of which bulkage is cut loose from the silo or the slot silos 5, 6. In the embodiment shown, the exsilage member 31 is constituted by a rotating cutting member that is electrically driven by the batteries. The direction of rotation of the cutting member is such that a tangent line at the top of the element is turned towards the feed wagon. In cooperation with a guide plate 37 provided above the exsilage member 31, a flow of bulkage is effected in the direction of the feed wagon. This flow is guided downwardly by rear wall 36 to the mixing augers arranged thereunder in the lower part of feed box 8 functioning as the obliquely positioned rear wall 36 which forms a rebound plate. In an alternative embodiment, feed wagon 1 comprises a shovel member to shovel up cut loose silage and to guide same to a grating-covered opening in the top of feed box 8 or the like.

In addition to the said passive infrared detectors, feed wagon 1 comprises near its front a passive infrared detector 38, which is directed to the-pivotal range of the exsilage member 31 or of a shovel element arranged at the front of wagon 1. In an advantageous embodiment, detector 38 disposed to extend telescopically near the top of the feed wagon may be so that the risk of contamination is minimal. In the embodiment shown, the detector 38 is situated near the buckle in arms 35 and the detection range is directed to the downward extending part of these arms so that the detection range covers, all positions of the arms 35, exsilage member 31 as well as an inlet opening near the bottom of wall 36 of the feed box 8.

In the embodiment shown, the unloading means of the feed wagon 1 are constituted by two augers 33 arranged transversely to the longitudinal direction of the feed wagon. Each of these is turned towards and beyond a lateral side of feed box 8. After the automatic opening of a slide in the bottom of feed box 8, fodder is received by the augers. In the present embodiment, an auger 33, also driven by batteries 22 of feed wagon 1, is pivotable about a shaft disposed in longitudinal direction near the said opening in the bottom of the feed wagon 1 in such a way that feed troughs in or adjacent to feed alley 3 of different heights can be filled.

Hereafter the operation in practice of the feed wagon and the method according to the invention will be set out in further detail.

The data relating to positions of all beacons 9–17 in the working environment, together with data relating to cowshed 2, and silos 5–7 driving path 18 and the dimensions thereof, have been inputted in onboard computer 23 of the feed wagon 1. On the basis thereof and because of the fact that all the beacons 9–17 have different identification signals, onboard computer 23 deduced for example, that beacons 10 and 11 indicate the beginning of the outermost walls of two slot silos 5 and 6, while the width of the slot silos 5 and 6, and consequently the position of their unmarked walls, are known to onboard computer 23. Such dimensions and positions of the beacons 9–17 have to be inputted or programmed by the farmer only once, when the feed wagon is brought into use. This is effected by means of a ride accompanied by the farmer 2 during which the feed wagon is manually guided along the route 43 desired by the farmer. Objects to be detected by the scanner 21 if appropriate to serve as beacons are selected by the farmer and recorded in the computer 23. The established route 43 has been adopted and is placed in the memory of the onboard computer 23, can later be amended, as described. Following the established route 43, the feed wagon makes as many runs as required for the feed supply or as needed according to the central computer on a continuing basis.

In the present embodiment, the starting point of the route 43 is situated in cowshed 2 near doors 4. From that point the feed wagon 1 will orientates itself continuously based on its position relative to the two nearest detected beacons, for example, beacon 14 arranged in alignment with the longitudinal middle of the cowshed and a non-represented beacon inside cowshed 2. After having left cowshed 2, feed wagon turns to the right and then to the right again to drive into a slot silo 5 or 6; upon driving into slot silo 5 or 6, the place will be taken into account where silage has been taken during a previous trip, so that the silo 5 or 6 is exsilaged via exsilage member 31 to place silage into feed box 8 Then the feed wagon reverses and, after turning, moves in its forward direction to concentrate silo 7. On the route, each time the two nearest beacons that are detected this circumstance be used for the computerized determination of the position, the orientation and the driving speed of feed wagon 1. In this connection supports 15, 16 and 17 of the concentrate silo 7 may be marked to function as beacons as previously indicated.

When exsilaging has started, passive infrared detector 38 tuned to the pivotal range of the arm 35 is activated by onboard computer 23, to prevent human beings or animals present within the said range on or in front of the silage from being hit by exsilage member 31. An (non-shown) ultrasonic sensor is also focussed on this range. If an unexpected inanimate object is detected by such sensor, an attention signal is directed to the farmer by means of communication with the central computer. In the present embodiment, this signal consists of a paper print and/or a message on the display screen of central computer 30. Subsequently a different exsilage position is taken in the same slot silo 5 or 6. When the feed wagon has no longer access to another exsilage place, an alarm signal is given to the farmer. In the present embodiment, this means that, in addition to the attention signal, the farmer is alerted by a portable alarm means, constituted by a radiophone in this embodiment. When the infrared sensor detects an unexpected animate object, the onboard computer 23 transmits a warning signal by means of a sound producing element disposed on feed wagon 1. In the present embodiment, this sound signal comprises a text: "Your position is too close to this vehicle. Please keep away". When this signal has no effect, the detected object may be an escaped animal or a human being unable to move, and onboard computer 23 will give an already described alarm signal. After having given an alarm signal, feed wagon 1 always takes an inactive position. This position can only be changed by the farmer by means of onboard computer 23. When feed wagon 1 meets with an unexpected object on its route 43, a calculation is made, on the basis of the defined position of the feed wagon and the width of the driving path 18 known to the computer, whether or not there is enough room left to maneuver around the object. When this is not the case, the described alarm procedure is followed.

For the purpose of loading bulkage, arm 35 is raised into a position above the silage by means of the hydraulic cylinder/piston units 39, and the mixing wagon is subsequently driven closer thereto. Subsequently in a first blow, an exsilage blow is made over a half of the width of feed wagon 1, whereupon the arm 35 is raised again and the exsilage element 31 is shifted along its axis of rotation to the other half of the feed wagon for a second loading blow. When necessary, several blows are made after the feed wagon has moved over a distance of approximately one-half the cutting member 31 in the direction of the silo. During the blow, the guide element 37 is automatically repositioned so that it guides, in the upper position, the flow of material downward to the bottom of feed box 8, and, in the lower position, the flow of material upward to the obliquely arranged backwall 36 of the feed box 8. In present embodiment, the edge of guide plate 37 turned to the silo consists of stiff, resilient material. This edge moves during the blow along the newly created wall of the silo. Consequently, the quantity of bulkage that is flung away vertically is almost nil. The construction in parts of the exsilage element 31 has the advantage of preventing an undo discharge of batteries 22.

On approaching the concentrate silo 7, the feed wagon 1 maneuvers so that funnel-shaped opening 32 is positioned under the outflow opening thereof. In the present embodiment, the lid or slide of concentrate silo 7 is operated by means of a lever 34 that is pivotably arranged about a. horizontal shaft; the operating means for opening the concentrate silo are constituted by two vertically extending operating elements, each disposed near a side of feed wagon 1. These are provided near their free ends with a T-piece extending transversely to the lever of the concentrate silo. One end of lever 34 of the concentrate silo is pushed up by means of one operating element for the opening of the silo discharge door, and the other, opposite end of the lever 34 is pushed up by the other operating element for its closing. The time during which the silo discharge door is kept open by the feed wagon is defined by the onboard computer 23 in cooperation with the weighing device provided for feed box 8. The quantity of concentrate being loaded is based on an indicated mixture ratio and is related to the already loaded quantity of bulkage.

After having been loaded, the concentrate is mixed with the bulkage in feed box 8. In the present embodiment, the mixing takes place during the trip to cowshed 2. The starting point for the unloading of the mixed feed is established by of the position of the feed wagon in cowshed 2 and the last place that feed was unloading as recorded in the memory of the onboard computer during the previous trip; the route to be followed by the feed wagon 1 in cowshed being a fixed one. However, feed wagon 1 is also adjustable as to the method the wagon deposits the feed at animal stands which may be situated at some distance from each other, for this purpose feed wagon 1 is continuously instructed by central computer 23 regarding the stands to be provided with feed.

During its run in cowshed 2, feed wagon 1 is connected with an electrical power supply cable through sliding contact 26. The sliding contact 26 consists of a T-piece, of which the upper part is directed transversely to the cable, (which here provides a conductive contact) i.e. to the direction of travel feed wagon 1. The presence of feed wagon 1 in the cowshed 2 having been ascertained, by on-board computer 23 sliding contact 26 is automatically extended for the purpose of making electrical contact with the overhead cable.

In an alternative embodiment of the feed wagon according to the invention, it includes a sensor for tracking a cable, which installed in or on the ground and which establishes the route to be followed by feed wagon 1, the latter being provided with loading means cooperating with an exsilage device arranged in the slot silo that is capable of being moved in the longitudinal and lateral direction thereof. Such exsilage device comprises transferring means having a variable reach for the transfer into the feed wagon of cut loose silage. The exsilage device is activated and disactivated by feed wagon 1. In again another embodiment according to the invention, the feed wagon does not track a cable, but rather travels on a rail system.

Although we have disclosed the preferred embodiments of our invention, it is to be understood that it is capable of other adaptations and modifications within the scope of the appended claims.

Having disclosed our invention, what we claim is new and to be secured by Letters Patent of the United States is:

1. A feed wagon for feeding silage, fodder and/or concentrate to animals, such as cows, which is capable of being automatically moved between a feed loading station and a feed unloading station, passive beacons being disposed between said feed loading station and said feed unloading station the wagon comprising an automatic navigation system cooperating with said passive beacons to control its movement between said feed loading station and said feed unloading station.

2. A feed wagon in accordance with claim 1, which carries batteries and includes at least one ground engaging wheel powered by said batteries.

3. A feed wagon in accordance with claim 2, wherein a cable that carries electrical current is disposed between said loading station and said unloading station, the feed wagon comprising electrical contact means for operatively contacting said cable.

4. A feed wagon in accordance with claim 2, wherein said feed unloading station is in a cow shed, the feed wagon comprising recharging means in said cow shed for charging said batteries.

5. A feed wagon in accordance with claim 5, wherein said automatic navigation system comprises an onboard computer.

6. A feed wagon in accordance with claim 2, comprising an automatic steering device which is controlled by said onboard computer.

7. A feed wagon in accordance with claim 1, which carries a detection device for the detection of said beacons.

8. A feed wagon in accordance with claim 1, associated with a stationary computer, the feed wagon comprising communication means for communicating with said stationary computer.

9. A feed wagon in accordance with claim 7, wherein said detection device comprises a scanner which is rotatable about a vertical axis.

10. A feed wagon in accordance with claim 9, wherein said scanner comprises a laser sensor.

11. A feed wagon in accordance with claim 9, wherein said scanner comprises an ultrasonic sensor.

12. A feed wagon as claimed in claim 1, comprising security means for detecting when the feed wagon is likely to cause an accident or has caused an accident or an accident proximate the feed wagon has occurred, and upon making such a detection, causes the feed wagon to stop operating.

13. A feed wagon as claimed in claim 12, wherein said security means comprises an ultrasonic sensor.

14. A feed wagon in accordance with claim 12, wherein said security means comprises an electronic leveling device.

15. A feed wagon in accordance with claim 1, comprising security means for causing the feed wagon to stop operating when there is an accident or a possibility of an accident occurring proximate the feed wagon, said security means comprising a railing that surrounds the feed wagon as seen in plan, said railing including a make-contact part whereby when it contacts anything, it causes the feed wagon to stop operating.

16. A feed wagon in accordance with claim 1, comprising security means for causing the feed wagon to stop operating in the event of an accident or the possibility of an accident occurring proximate the feed wagon, said security means comprising a passive infrared sensor which is orientated in the direction of the feed wagon's travel and is adjustable for maximum effectiveness between one and four meters in front of the feed wagon.

17. A feed wagon in accordance with claim 16, wherein said passive infrared sensor is active to at least a height of approximately 20 centimeters above the ground.

18. A feed wagon in accordance with claim 1, comprising security means for causing the feed wagon to stop operating in the event of an accident or the possibility that an accident may occur, said security means comprising an infrared sensor for sensing the space under the feed wagon.

19. A feed wagon in accordance with claim 1, comprising hydraulically movable arms and loading means mounted between said arms.

20. A feed wagon in accordance with claim 19, wherein said loading means comprises a cutting device.

21. A feed wagon in accordance with claim 19, wherein said loading means comprises a passive infrared sensor that senses the space in the vicinity of said loading means.

22. A feed wagon in accordance with claim 1, comprising an electronic weighing device and an onboard computer for weighing feed loaded onto the feed wagon at said loading station.

23. A feed wagon in accordance with claim 1, wherein said loading station comprises a silo containing a feed concentrate and having a discharge door for discharging said concentrate therefrom into the feed wagon, the feed wagon comprising operating means for opening and closing said discharge door.

24. A feed wagon in accordance with claim 1, which carries an onboard computer, said onboard computer controlling the operations of the feed wagon.

25. A feed wagon in accordance with claim 1, comprising a feed mixing device.

26. A feed wagon in accordance with claim 1, which carries an onboard computer and includes unloading means, said unloading means being automatically controlled by said onboard computer.

27. A feed wagon in accordance with claim 26, wherein said loading means comprise discharge openings on the two lateral sides of the feed wagon.

28. A feed wagon in accordance with claim 1, comprising a prime mover, two front wheels operatively connected to said prime mover, and a rear steering wheel.

29. A feed wagon in accordance with claim 28, comprising a measuring device for measuring the distance travelled by the feed wagon, said measuring device operatively associated with a said wheel.

30. A feed wagon in accordance with claim 1, comprising means for loading feed from one area, carrying said feed to another area, and unloading said feed at said other area, and an onboard computer for controlling same, the operations of the feed wagon being entirely unmanned.

31. A feed wagon in accordance with claim 1, comprising a forward part and an aft part, a feed box in said forward part, electric batteries and an onboard computer in said aft part.

32. A feed wagon in accordance with claim 1, comprising loading means including a cutting device, said cutting device being movable horizontally and vertically relative to the remainder of the feed wagon and having a width which is less than that of the feed wagon.

33. A system for automatically supplying feed from a silo to stalls in a cow shed which comprises a feed wagon including silage loading means and silage discharge means, a route to be travelled by said feed wagon between said silo and said stalls, an onboard computer and detection means carried by said feed wagon, a plurality of passive beacons disposed along said route, said detection means detecting said passive beacons and guiding said feed wagon via said onboard computer whereby said feed wagon automatically loads silage at said silo, carries said silage to said stalls in said cow shed by travelling said route from said silo to said cow shed while being guided by said passive beacons and discharging said silage from said feed wagon by said silage discharge means into said stalls, the movement of said feed wagon being controlled by said onboard computer while travelling said route between said silo and said cow shed.

34. A method of delivering silage from a silo to stalls in a cow shed which comprises the steps of (a) automatically loading a relatively small quantity of silage onto a feed wagon at said silo, (b) moving said relatively small quantity of silage in said feed wagon from said silo to said cow shed by guiding said movement of said feed wagon by an onboard computer and a detector associated therewith that detects passive beacons between said silo and said cow shed, (c) automatically discharging said relatively small quantity of silage from said feed wagon into said stalls in said cow shed, (d) moving said feed wagon after relatively small quantity of silage has been discharged therefrom from said cow shed back to said silo by guiding said movement of said feed wagon by said onboard computer and said detector associated therewith detecting said passive beacons between said cow shed and said silo, and (e) repeating steps (a) through (d) on a substantially continuous basis.

* * * * *